Feb. 2, 1943.   P. J. McLAREN   2,309,704
GEAR CAM TRACK AND MEANS AND METHOD FOR MAKING SAME
Filed June 24, 1941   2 Sheets-Sheet 1

INVENTOR.
PETER J. MCLAREN
BY

Feb. 2, 1943. P. J. McLAREN 2,309,704
GEAR CAM TRACK AND MEANS AND METHOD FOR MAKING SAME
Filed June 24, 1941 2 Sheets-Sheet 2
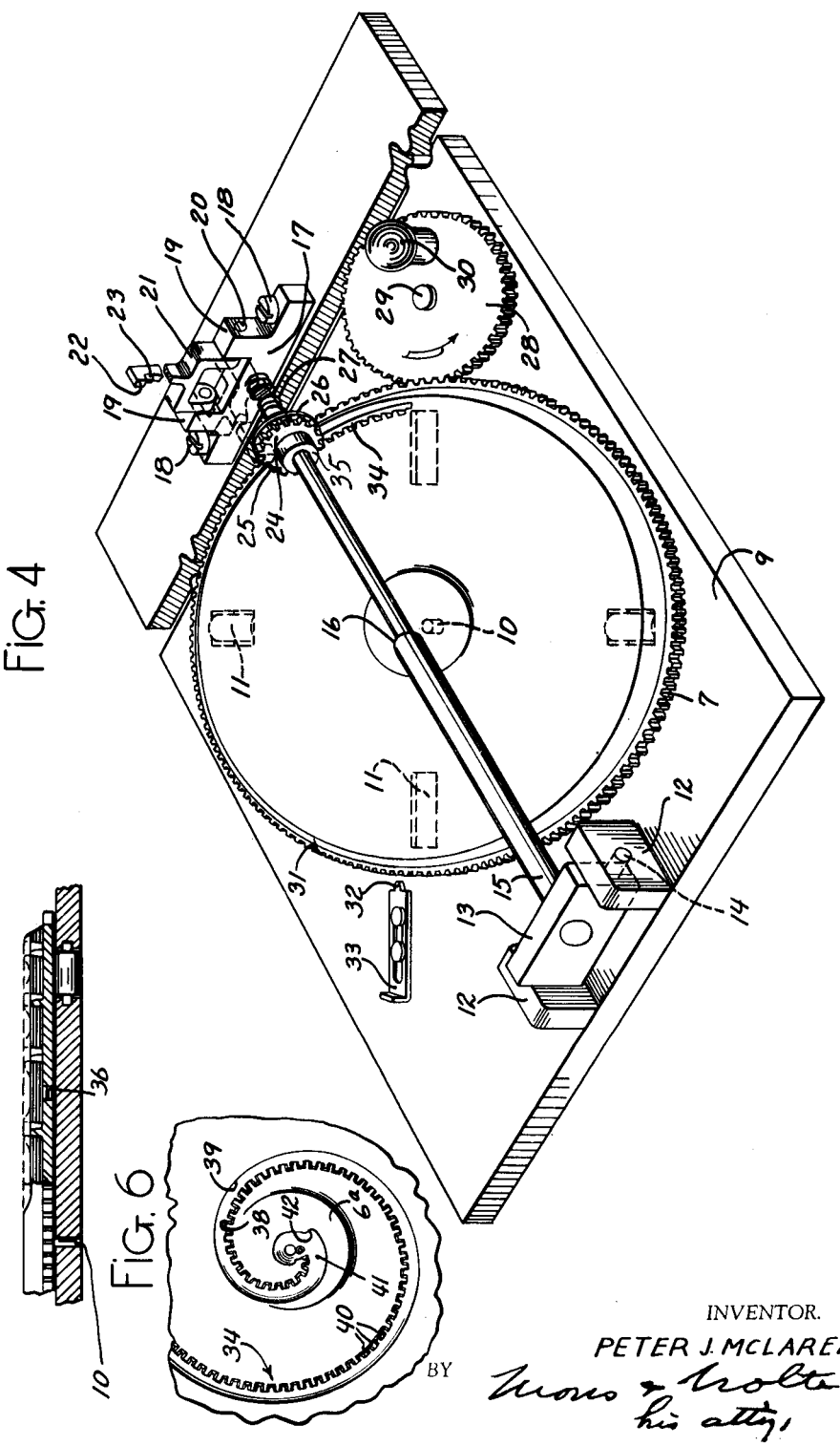
INVENTOR.
PETER J. McLAREN Patented Feb. 2, 1943

2,309,704

UNITED STATES PATENT OFFICE 2,309,704

GEAR CAM TRACK AND MEANS AND METHOD FOR MAKING SAME

Peter J. McLaren, New York, N. Y., assignor, by mesne assignments, to Reconstruction Finance Corporation, New York, N. Y., a corporation of the United States Application June 24, 1941, Serial No. 399,564

15 Claims. (Cl. 18—5)

This invention relates to a means and method of providing a spiral gear constructed to guide a follower gear so that the follower gear teeth are caused to mesh properly with the several teeth of the cam gear. It has been the practice heretofore in using such cam gears to provide a yoke which embraces a portion of the row of spirally arranged teeth and which is slidable along a guide shaft, the yoke serving to hold the follower gear in proper mesh with said teeth. Difficulty is had in using this type of arrangement for guiding the follower gear in securing proper mesh between the gears, particularly at the inner extremity of the cam gear. It is a main object of the present invention to provide for the making of a cam gear in which this difficulty is avoided and in which the necessity is avoided of providing an accessory guiding device for the follower gear, such as the yoke above mentioned.

An important object of the invention is to provide an apparatus and method for making such a cam track in which the face of a gear is covered with a layer of moldable plastic material and means is provided for causing a molding gear to press the cam track in such layer of plastic material. After the molding operation is complete, the plastic material is hardened and any excess material removed from its surface, after which the so molded and finished gear may be used to guide and drive a follower gear similar to the molding gear used in the molding operation. The cam gear of plastic material may, after its formation, be used as a pattern to form a mold in which a cam gear of identical shape but of a harder material such as bronze, aluminum or other suitable metal may be cast.

In the illustrated embodiment of the invention, the operation of molding the plastic material to form a cam track is commenced at the outer end of the cam track by impressing a flanged molding gear, similar to the follower gear to be later driven by the cam gear, into the plastic material.

It is a further purpose of the invention to provide a suitable indexing device in connection with such a molding operation for assuring that the cam and its molding gear are in proper positions with respect to each other when they are brought together at the commencement of the molding operation.

Further objects of the invention will become apparent to those skilled in the art as the description thereof proceeds. For a better understanding of the invention reference is made to the accompanying drawings, in which:

Fig. 4 is a perspective view of a guide cam forming device embodying the invention;

Fig. 5 is a fragmentary sectional view showing a portion of the device of Fig. 4 and of the cam track formed thereon; and Fig. 6 is a top plan view showing the center portion of a cam gear formed on the device shown in Fig. 4 and of its supporting plate.

Figure 1:
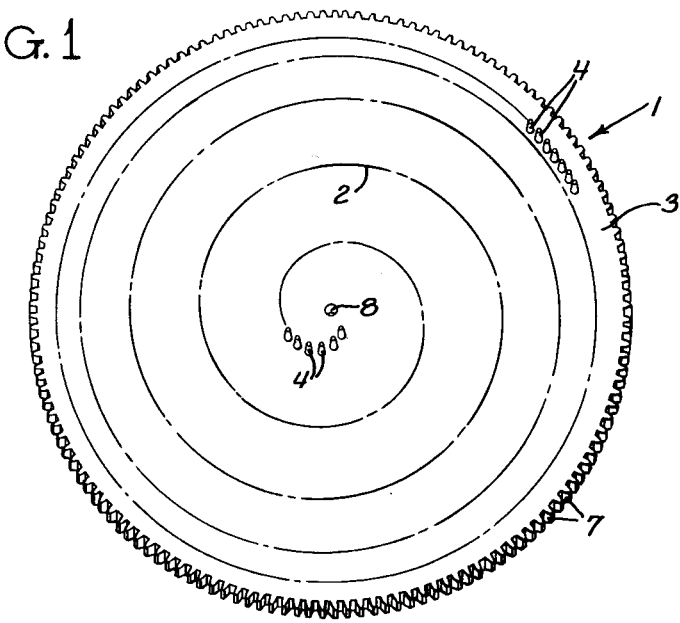
Fig. 1 is a perspective view of a pin cam gear and its supporting plate.
Figure 2:
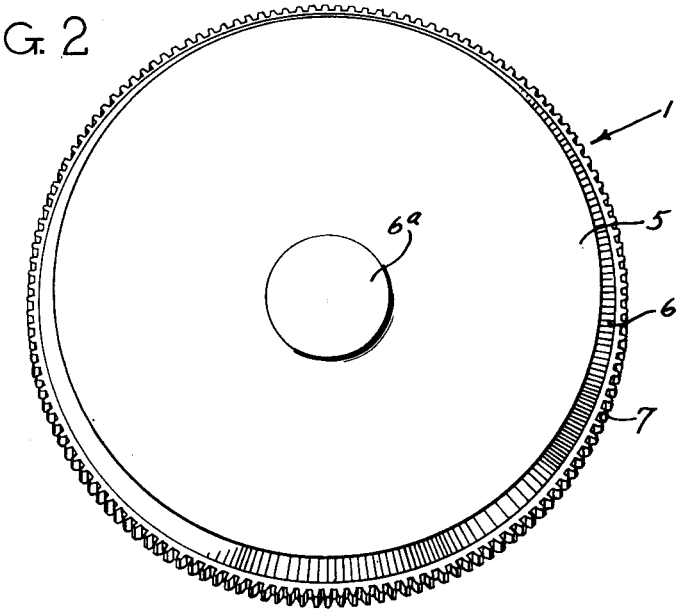
Fig. 2 is a perspective view of the pin cam gear and plate of Fig. 1 covered with a layer of plastic material.
Figure 3:
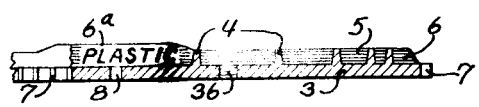
Fig. 3 is a fragmentary sectional view showing a portion of the pin cam gear of Fig. 2 and its supporting plate.

Referring to Figs. 1 to 3, an embodiment of the invention is shown in connection with a spiral cam gear 1 which is formed by plotting a spiral shaped curve 2 of the desired shape on a supporting metal base plate 3, drilling a series of holes at suitably spaced apart points along the spiral curve 2 and driving metal pins 4 into such holes, the portions of the pins which extend from the upper surface of the plate 3 being tapered, as shown, to provide pin gear teeth for meshing with a follower gear. The cam gear 1 is herein illustrated as a cosine gear, being shaped to secure a versedsine output from its follower gear, as disclosed in connection with Figs. 19 to 22 of Patent No. 2,273,652, issued February 17, 1942, in the names of William L. Maxson and Peter J. McLaren. It will be understood, however, that the invention is not limited to cam gears of this particular shape, but is adapted for use with cam gears of different shapes. A layer 5 of suitable plastic material which is soft enough to receive the impression of the follower gear teeth, and which may later be hardened in a suitable manner, depending on the composition of the plastic material, is spread over the upper surface of the plate 3. The plastic material may be applied manually, as with a spatula or similar instrument and its upper surface smoothed off at a level with the top of the pins 4. The plastic should be tapered off at the periphery as indicated at 6. In the preferred form of the invention, the layer of plastic material is made somewhat thicker in the region around the center of the cam gear, as indicated at 6a in Fig. 3, for a purpose to be later described. Care should be taken to insure that the tapered portion 6 allows adequate material beyond the outermost pins to allow the formation of a proper cam track therein while at the same time it should not extend so far outwardly as to interfere with or clog the gear teeth 7 which are formed on the periphery of the cam plate 3. The base plate 3 is provided at the center of the gear 7 with a cylindrical bore 8 for a purpose to be later described.

The cam plate, prepared as heretofore described, is placed in a fixture of the type shown in Fig. 4 which comprises a supporting base 9 from which projects a pivot pin 10 adapted to enter the bore 8 and provide an axis of rotation for the plate 3 and its cam 1. A plurality of spaced supporting rollers 11 are mounted in the base 9 to provide an adequate means for rotatably supporting the plate 3 and to prevent it from tilting. Secured to the base 9 near one end thereof is a pair of supporting brackets 12 between which is disposed a shaft supporting block 13 pivotally mounted on a pair of pivot pins 14 journaled in the brackets 12, only one of the pins 14 being shown. Secured firmly to the block 13 is a shaft 15 which is provided at the proper position thereon with a shoulder 16, the opposite end of the shaft 15 having secured firmly thereto a shaft supporting block 17 adapted to be releasably secured to the base 9 by the securing screws 18. The block 17 is provided with a pair of upstanding lugs 19 between which is pivotally supported, as at 20, a follower gear indexing member 21, illustrated as being in the form of a hook and having at its end a downwardly depending hook portion 22 and at an intermediate point thereon a downwardly projecting locating tooth 23.

Mounted for free rotation on the shaft 15 is a follower gear 24, the gear teeth 25 of which are of the proper shape and pitch to properly mesh with the pins 4 of the cam gear 1, the follower gear having secured to the outer end thereof a thin flange 26 whose diameter is preferably the same as that of the gear 24. A spiral compression spring 27 surrounds the outer end of the shaft 15, one end of the spring bearing against the supporting block 17 and its inner end bearing against the flange 26. For rotating the plate 3 and the spiral cam gear 1, a gear 28 is provided which is rotatably supported on a stub shaft 29 carried by the base plate 9. Any suitable means, such as a handle 30, may be provided for manually rotating the gear 28.

In using the device to form a cam track for the follower gear 24, the screws 18 having been withdrawn, the follower gear 24 is pushed outwardly along the shaft 15 against the bias of the spring 27 and the indexing lever 21 lowered into the dotted position shown, so that its hook 22 engages the inner face of the gear 24 and holds the latter against the bias of the spring 27. Simultaneously with the lowering of the hook 22, the tooth 23 will engage between two of the gear teeth 25 and rotate the follower gear 24 in one direction or the other on the shaft 15 to bring it into proper position, should it not already be in such position, as to mesh properly with the outermost pins of the cam gear 1. The shaft 15, gear 24 and block 17 are then raised as a unit about the pivot pins 14 into a substantially vertical position. The plate 3, coated with plastic material as above described, is then placed in position on its pivotal support 10 and the gear 28 then rotated until an indicator 31 mounted on the upper surface of plate 3 between two of its teeth 7 comes opposite a pawl 32 formed at the inner end of a slide 33 mounted on the base 9. The pawl is then pushed inwardly to lock the cam plate 3 in position while the impression of the outer end of the cam track in the plastic material 5 is commenced. This is then effected by lowering the block 17 and shaft 15 as a unit into the horizontal position shown in Fig. 4. The screws 18 are then tightened until the block 17 comes to rest on the base plate 9 so that an impression is made in the plastic material by the lower portion of flange 26 and gear 24, which is now in proper mesh with the outermost cam pins 4.

The slide 33 is then moved to withdraw the pawl 32 from between the gear teeth 7 and the indexing lever 21 raised into the full line position shown. Rotation of the handle 30 and gear 28 in the direction shown by the arrow will then cause a spirally shaped cam track 34 to be molded or impressed in the plastic material 5, the spring 27 serving to maintain the flange 26 pressed against the outer edges of successive cam pins 4 as the follower gear 24 rotates so that its teeth 25 are maintained in proper meshing engagement with the cam pins 4. Rotation of the handle 30 is continued until the hub 35 of gear 24 comes into engagement with the shoulder 16 of shaft 15, at which time the rotation of gear 24 is arrested when it is in engagement with the innermost pin 4 of the spiral cam 1.

The molding of the cam track is now completed and the screws 18 may now be withdrawn, the shaft 15 with its attached block 17 raised and the cam plate 3 removed from the fixture after which the plastic material 5 with the cam track 34 molded therein is permitted to harden. The hardening operation will obviously depend on the nature of the specific plastic material used, mere drying at normal room temperature being sufficient to effect the hardening with certain plastic materials to be described. It is desirable that the major portion of the top surface of the cam track 34 should be substantially in the same plane with the top of the cam pins 4. Means is, therefore, provided in the form of a plurality of holes 36 which are tapped into the lower portion of plate 3 whereby the plate 3 may be secured in a lathe, grinding machine or other device wherein the excess material which has been displaced above the general level of the plastic material 5, as indicated at 37 by the dotted lines shown, may be removed. The thicker plastic material at the center of the cam gear, as indicated at 6a in Figs. 3 and 6, is preferably not removed but is left at the thickness produced by the holding operation. After the cam track 34 has been completed in the manner described, it may be used to guide a follower gear similar to the gear 24 and which may be provided with a flange similar to the flange 26, along the spiral track to secure proper meshing of the gears at all times. Or, the cam track 34 made as above described, may be reproduced in a harder material such as bronze, aluminum or other metal alloy by a suitable molding or die casting operation in any known manner.

The cam track 34 (Fig. 6) consists of spaced inner and outer walls 38 and 39, the inner wall 38 having gear teeth 40 molded therein, which teeth are generated or formed by the teeth of the gear 24. The outer wall 39 of the cam track is formed by the flange 26 and throughout the major portion of the cam track the spacing between the walls 38 and 39 is substantially uniform, as illustrated in Fig. 6. The curvature at the inner end of the spiral cam 1, however, changes very rapidly and since the plane of the gear 24 is substantially tangent to the cam curve at all points therealong, it results that at the center portion of the gear, the flange 26 molds the plastic material into such shape that the slope or steepness of the cam wall 39 decreases toward the inner end of the cam gear. This results in a gradual increase in the spacing between the walls 38 and 39 of the cam track as the inner end thereof is approached, as illustrated in Fig. 6 at 41. The outer face of the flange 26 forms a shoulder 42 in the plastic material, which terminates the inner end of the cam track when the gear 24 is in engagement with the innermost cam pin 4.

Since the bottom of the outer cam wall 39 at the center of the gear is tangent to the bottom of the flange 26, this portion of the cam wall is not effective in urging the follower gear inwardly toward the center of the cam gear. The top portion of wall 39 is steeper, however, and since this portion of the wall engages the flange 26 to bias the follower gear inwardly, the component of force for guiding the follower gear inwardly may be increased by making the cam wall 39 higher. This desirable result may be readily accomplished in the manner above indicated; namely, by making the plastic layer 5 somewhat thicker in the region about the inner end of the cam gear.

Any suitable plastic material may be used for molding the cam track therein. A convenient material is one used by dentists for taking dental impressions and is known under the trade name "Mizzy low heat compound." This material is a wax which may be softened to render it plastic by heating it to 125° F., as by immersing it in warm water, just before use. After the cam track has been formed therein, it is only necessary to allow the material to cool to normal room temperature whereupon it becomes hard and stable. Or other dental waxes sold under different trade names may be used, as may also beeswax or paraffin. Other suitable plastic materials which may be used are modeling clay, pottery clay, cotton plaster, plaster of Paris, fine molding sand, soap, tar, putty, chicle or thermoplastic materials of which "Amphenol" is an example. Or liquid rubber, which has been applied to the plate 3 in several thin layers and allowed to harden slightly before the impression is made, is satisfactory. Also certain gelatinous materials, of which agar-agar is an example, may be used by heating such materials to a suitable degree before the cam track is molded and cooling them shortly thereafter.

No claim is made herein to the cam gear which is produced by the herein described method and apparatus, such gear being described and claimed in my divisional application, Serial No 432,169, filed February 25, 1942, for Cam gearing.

I have described what I believe to be the best embodiments of my invention. I do not wish, however, to be confined to the embodiments shown, but what I desire to cover by Letters Patent is set forth in the appended claims.

I claim:

1. The method of forming a cam track adapted to guide a follower gear along and in proper meshing engagement with a cam gear, which consists in covering the cam gear with a layer of plastic material, impressing the follower gear in said plastic material into mesh with the cam gear and rotating the cam gear, while maintaining the follower gear pressed toward the cam gear teeth, to thereby cause the follower gear to form the desired cam track in the plastic material.

2. The method of forming a cam track adapted to guide a follower gear along and in proper meshing engagement with a spirally shaped cam gear, which consists in covering the cam gear with a layer of plastic material, impressing the follower gear in said plastic material into mesh with the outer end portion of the cam gear and rotating the cam gear, while maintaining the follower gear pressed toward the cam gear teeth, to thereby cause the follower gear to form the desired cam track in the plastic material.

3. The method of forming a cam track adapted to guide a flanged follower gear along and in proper meshing engagement with a spiral pin cam gear, which consists in covering the cam gear with a layer of plastic material whose thickness is substantially equal to the height of the pins, impressing the follower gear in said plastic material and into mesh with one or more pins at one end of the cam gear and rotating the cam gear while simultaneously biasing the flange of the follower gear into engagement with the pins of the cam gear in succession.

4. A device adapted to form a cam track for guiding the follower gear of a cam gear, said device comprising, in combination, a layer of plastic material disposed on the cam gear, guide means for maintaining the follower gear in mesh with the cam gear, and means for simultaneously rotating the cam gear to thereby cause the follower gear to impress the desired cam track in said plastic material.

5. A device as set forth in claim 4 in which said guide means comprises a shaft on which the follower gear is slidably supported.

6. A device as set forth in claim 4 in which said guide means comprises a shaft on which the follower gear is slidably supported, and yielding means arranged to bias the follower gear longitudinally along said shaft.

7. A device as set forth in claim 4 in which an indexing device is connected with the cam gear to indicate the positioning of an end of the cam gear for proper meshing engagement with the follower gear.

8. A device adapted to form a cam track comprising, in combination, a supporting base, means adapted to rotatably support a spiral cam gear on said base, said cam gear being overlaid with a layer of plastic material; a shaft extending transversely of the cam gear, means for supporting said shaft on the base above the cam gear, and a follower gear disposed on and slidable along said shaft, the lower portion of said follower gear extending into said plastic material for meshing engagement with the cam gear.

9. The device as set forth in claim 8 in which the shaft supporting means comprises a support disposed at one end of the shaft and arranged to pivotally support the same.

10. The device as set forth in claim 8 in which the spiral cam gear comprises a plurality of uniformly spaced upwardly extending pins.

11. The device as set forth in claim 8 in which a compression spring is disposed at one end of the shaft and arranged to bias the follower gear inwardly along the shaft.

12. The device as set forth in claim 8 in which an indexing device is disposed at one end of and above the shaft, said indexing device being arranged to engage one or more teeth of the follower gear to rotate said gear into a predetermined position on the shaft.

13. The method of forming a cam track adapted to guide a flanged follower gear along and in proper meshing engagement with a spiral pin cam gear, which consists in covering the outer portion of the cam gear with a layer of plastic material whose thickness is substantially equal to the height of the pins and covering the inner portion of the gear with a layer of said plastic material whose thickness is substantially greater than the height of the pins, impressing the follower gear in said plastic material and into mesh with one or more pins at one end of the cam gear and rotating the cam gear while simultaneously biasing the flange of the follower gear into engagement with the pins of the cam gear in succession.

14. The method of forming a spiral gear track and guide which consists in coating a gear pattern with plastic, sinking a flanged molding gear in the plastic, and moving the molding gear substantially radially of the pattern while rotating the pattern gear and the molding gear in harmony with one another.

15. The method of forming a spiral gear track and guide which consists in coating a gear pattern with plastic, sinking a flanged molding gear in the plastic, and moving the molding gear substantially radially of the pattern while rotating the pattern gear and the molding gear in harmony with one another, and casting in suitable gear metal duplicates of the pattern so formed.

PETER J. McLAREN.